United States Patent [19]

Srivastava et al.

[11] Patent Number: 4,611,229
[45] Date of Patent: Sep. 9, 1986

[54] AUTO RANGE HORIZONTAL AUTOMATIC PHASE CONTROL

[75] Inventors: Gopal K. Srivastava, Buffalo Grove; Ronald B. Lee, Skokie, both of Ill.

[73] Assignee: Zenith Electronics Corporation, Glenview, Ill.

[21] Appl. No.: 505,518

[22] Filed: Jun. 17, 1983

[51] Int. Cl.[4] .............................................. H04N 5/04
[52] U.S. Cl. .................................... 358/158; 358/148
[58] Field of Search ...................... 358/158, 148, 159; 331/20, 1 R, 10, 11, 1 A; 328/72, 73, 74, 134; 307/269, 527, 528

[56] References Cited

U.S. PATENT DOCUMENTS

| | | | |
|---|---|---|---|
| 3,505,473 | 4/1970 | Dillenburger et al. | 358/158 |
| 4,122,488 | 10/1978 | Mikado | 331/20 |
| 4,151,485 | 4/1979 | LaFratta | 331/11 |
| 4,309,662 | 1/1982 | Baudoux | 331/1 A |
| 4,335,403 | 6/1982 | Srivastava | 358/148 |
| 4,467,359 | 8/1984 | Hosoya | 358/158 |
| 4,498,103 | 2/1985 | Aschwanden | 358/148 |

Primary Examiner—Tommy P. Chin
Assistant Examiner—David E. Harvey

[57] ABSTRACT

A circuit for phase locking the flyback pulse to a reference signal. A phase detector receives the flyback pulse (to be phase locked) and receives the reference signal. It outputs an error signal to a control circuit including first and second differential amplifiers having differing operational characteristics, one being linear in a narrower range than the other. The differential amplifier having the larger linearity range provides control signals to a coarse delay adjust circuit in the form of a programmable divider which also receives clock pulses at a high multiple of the horizontal frequency $f_H$. The output of the coarse delay adjust circuit is applied to a fine delay adjust circuit responsively connected to the output of the first differential amplifier, which is linear over the narrower range. The output of the fine delay adjust circuit is coupled to the horizontal system. Large changes in the phase of the flyback signal are achieved by recognizing large deviations in the wider range differential amplifier and causing the coarse delay adjust circuit to make a relatively large adjustment in the phase of the output signals thereof. Thereafter, fine adjustments are made by the fine delay adjustment circuit in response to control signals from the narrower range differential amplifier.

17 Claims, 5 Drawing Figures

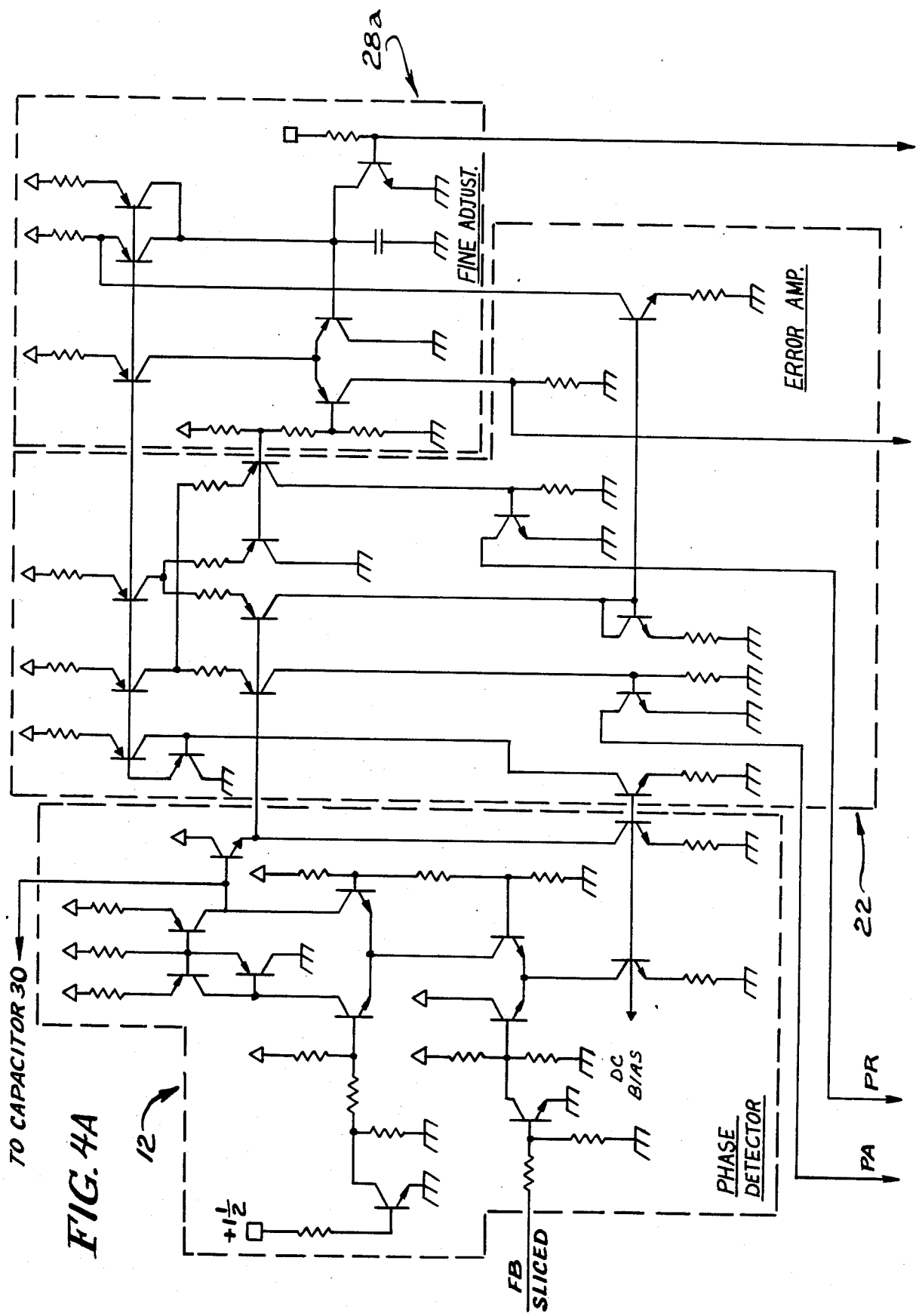

AUTO RANGE HORIZONTAL AUTOMATIC PHASE CONTROL

BACKGROUND OF THE INVENTION

The present invention is directed to circuits in a television receiver or monitor which relate the flyback pulse to the video signals.

Most television sets today use a magnetic yoke as part of the horizontal system for causing movement of the electron beam in the cathode ray tube. When the electron beam returns in preparation for a new trace, the magnetic field of the yoke collapses and a flyback pulse is thereby induced. The video trace begins some time after the flyback pulse ends. Generally, flyback pulses coincide with horizontal blanking.

The object of the present invention is to provide an improved circuit for controlling the timing of the flyback pulse.

Another object of the present invention is to provide a circuit for controlling flyback timing which can be embodied in a monolithic silicon chip.

A further object of the invention is to provide a timing system which has good noise immunity.

Another object of this invention is to provide a flyback timing control circuit which automatically compensates for tolerances in yokes, transistors, and other components which vary the delay time of the flyback pulse.

SUMMARY OF THE INVENTION

According to various aspects of the present invention, which is more particularly defined by the claims hereof, an existing signal is used as a reference to which the induced flyback pulse is locked by a unique combination of circuits. The illustrative combination set forth infra involves determining the error between the reference signal and the actual flyback pulse, making coarse delay adjustments automatically in response to the detected error if the magnitude of the error exceeds a predetermined amount, and making fine adjustments after a coarse adjustment, or, if the magnitude of the error does not reach the predetermined amount, then simply making the fine adjustments (whenever necessary) to the signals applied to the horizontal system which generates the flyback pulse.

BRIEF DESCRIPTION OF THE DRAWINGS

In describing a preferred embodiment of the present invention, reference is made to the accompanying drawings wherein:

FIGS. 4a and 4b are schematic diagrams illustrative of several of the circuits of FIG. 1.

DESCRIPTION OF A PREFERRED EMBODIMENT

By way of background, flyback signals are induced in a mangetic yoke located around a cathode ray tube, the yoke being connected to a horizontal output transistor (HOT) which, in turn, is connected to receive the output of a pulse width modulator whose input receives square wave signals at the horizontal frequency $f_H$. The pulse width modulator is used for high voltage regulation and can be eliminated in some systems. The input to the horizontal output transistor is a drive signal. When the pulse width modulator circuit is used, it changes the duty cycle of the drive signal by moving the leading edges (the ON edges) of the $f_H$ square waves. The trailing edges do not move, and their timing is one basic factor in determining when the flyback pulse FB occurs. The flyback pulse occurs at some delayed time $t_d$ after the trailing edge of the drive signal. Many elements contribute to this delay, including the horizontal output transistor, the yoke, amplifiers, and drivers, for example.

This invention concerns locking the flyback pulse into a relationshp with a reference signal. In the preferred embodiment herein, the reference signal which is used is called FHDFB which is a signal related to horizontal sync. The positive going edge of the signal FHDFB is arranged to occur at a time during horizontal blank, and the circuitry for generating this particular reference signal is not considered part of the present invention. Engineers who have worked in the television art are familiar with the generation of reference signals for use in flyback timing circuits.

In the preferred embodiment of the present invention described herein, the timing of the flyback pulse FB is adjusted by moving the OFF edge of the drive signal to the horizontal output transistor. This changes the time occurrence (phase) of the flyback pulse FB.

Figure 1:
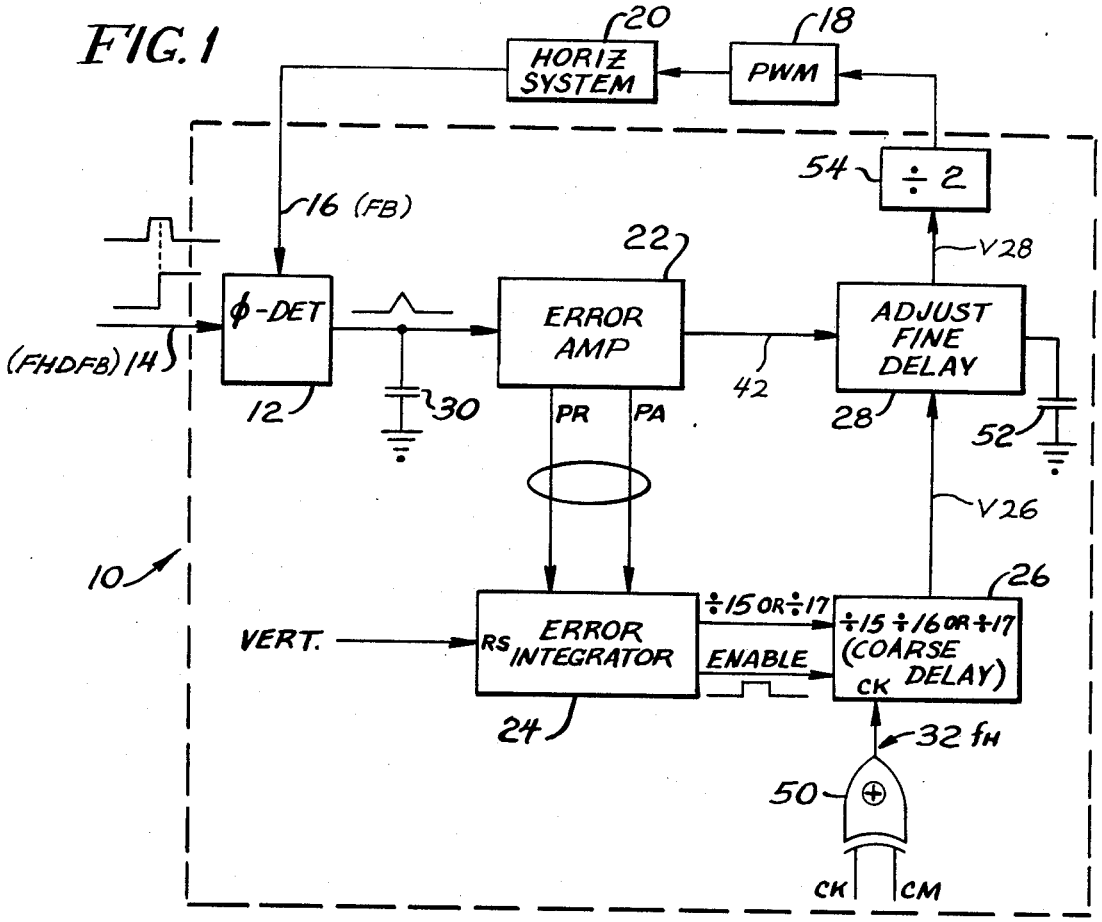
FIG. 1 is a block diagram showing a preferred embodiment according to the present invention, coupled to the pulse width modulation circuits and horizontal system of an associated television receiver.

A circuit 10 (in the dashed line) according to the present invention is illustrated in FIG. 1. Circuit 10 includes a phase detector 12 which receives the reference signal FHDFB at one input 14 and receives the flyback pulse FB to be adjusted at a second input 16. The reference signal FHDFB is locked to the sync signal by a phase locked loop (not shown). Circuit 10 provides an output signal which is applied to the pulse width modulator 18 whose output is applied to the horizontal system 20. The horizontal system consists of the horizontal output transistor, the yoke, amplifiers, drivers, and other elements which contribute to the delay time $t_{delay}$ in the flyback pulse FB. Apart from the phase detector 12 mentioned above, this circuit 10 includes an error amplifier 22, an error integrator 24, a coarse delay adjustment circuit 26 (having an output V26), and a fine delay adjustment circuit 28 (having an output V28).

Phase detector 12 can be a phase detector of conventional design. It basically measures the phase difference between its two inputs, the reference pulse FHDFB and the flyback pulse FB to be adjusted. The output signal of phase detector 12 is referred to as an error signal which is a current which is integrated by an integrating capacitor 30. Capacitor 30 is coupled to apply a voltage to the input of error amplifier 22.

Figure 2:
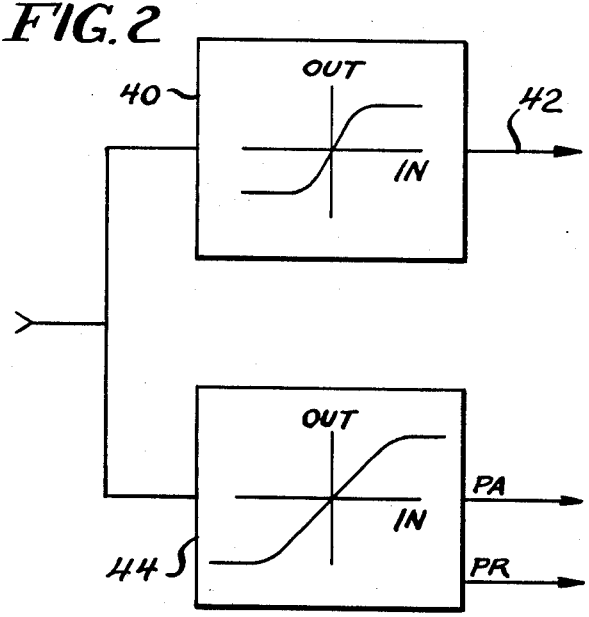
FIG. 2 is a schematic illustration of an error amplifier used in FIG. 1.

Error amplifier 22 illustratively comprises two saturating differential amplifiers shown diagramatically in FIG. 2. The first differential amplifier 40 can have a traditional construction operating in the single-ended configuration. The operational characteristics of this first differential amplifier are shown in a sketch contained in block 40. The output of differential amplifier 40 is an analog output on a lead 42.

Operating in parallel with the first differential amplifier 40 is a second differential amplifier 44. It too has a traditional construction and is connected in the single-ended configuration. However, this differential amplifier saturates at a larger input voltage than the differential amplifier 40, as suggested by comparing the operational curve of this second differential amplifier contained within block 44 to the operational curve contained within block 40. It will be observed that the extremes of the operational curve of amplifier 44 are more remote from the origin than the extremes of the operational curve of differential amplifier 40.

The extreme areas of operation of amplifier 44 are of particular interest. Two outputs of amplifier 44 are digitized by appropriate circuitry into signals PA and PR. Illustratively, the signal PA is high only when the output of amplifier 44 is very negative, and is otherwise low. The digital signal PR is high only when the output of differential amplifier 44 is very positive, and is otherwise low. When the output of amplifier 44 is between the extremes shown in the sketch in box 44, the digital signals PA and PR both have a low value.

It will be understood that if either of the digital signals PA or PR are high, this signifies a condition where there is a relatively large phase difference between the flyback pulse FB to be adjusted and the reference FHDFB. In response, a coarse adjustment should be made. On the other hand, if neither of the digital signals PA and PR are high, this signifies that, at most, only comparatively fine adjustments are necessary to the flyback pulse FB to be adjusted. Such adjustments occur in accordance with the analog output of amplifier 40. Coarse adjustments occur in accordance with the outputs of amplifier 44.

Returning to FIG. 1, the digital outputs of error amplifier 22 need not be connected directly to the coarse delay adjustment circuit 26, and, in the illustrative embodiment are applied to the error integrator circuit 24. This circuit is used to improve the confidence that a genuine error in the timing has occurred, i.e. that there is not merely a one-time excursion. Consequently, the errors denoted by outputs PR and PA of error amplifier 22 are integrated. If the integral reaches a threshold value, then control signals are provided to the coarse delay adjustment circuit 26 to effect a change in phase.

The error integrator 24 illustratively is an up-down counter. For example, it may be a four-bit up-down counter which, during each vertical interval, is preset to a count of six and counts up one count for each horizontal line for which PA is high, and counts down one count for each horizontal line for which PR is high. One threshold can be the binary number 1101, and the other threshold can be the binary number 1111. These can be easily detected by determining when the first, third and fourth least significant bits are set to the binary number "one". If that condition is found to exist, then the state of the second least significant bit, which will be either "zero" or "one", will indicate whether the phase of flyback pulse FB with respect to FHDFB is to be retarded or advanced.

The coarse delay adjust circuit 26 can be embodied in the form of a programmable divider which may divide an input clock signal by selectable values. Illustratively, circuit 26 can divide by fifteen, sixteen, or seventeen, and receives a clock signal to be divided which is 32 times the horizontal frequency $f_H$. Such a signal is conveniently provided in a television receiver in many manners which are well known to those skilled in the art. For example, the video signal can be applied to a sync stripper which applies sync to a phase locked loop which outputs one signal at $16f_H$ referred to as CK, and a second signal at the same frequency but 90° out of phase referred to as CM. Signals CK and CM can be applied to an EXCLUSIVE OR circuit 50 which therefore provides an output at a frequency of $32f_H$. The programmable divider, that is, coarse delay adjust circuit 26, normally divides by sixteen to output pulses which occur at a frequency of $2f_H$. If instructed to divide by, for example, fifteen, then the clock signals are divided by fifteen only once during a field, and are otherwise divided by the standard divisor, sixteen, during the remainder of that field. Dividing by fifteen as illustrated above advances the phase of flyback pulse FB by one clock period, which is in this case about two microseconds. In any field, only one coarse correction to the FB phase is allowed. Therefore, if during the next vertical field trace period the Error integrator block 24 indicates that further correction is necessary, then once more the coarse delay adjust circuit 26 will divide the $32f_H$ signal by fifteen instead of nominal division by sixteen.

Figure 3:
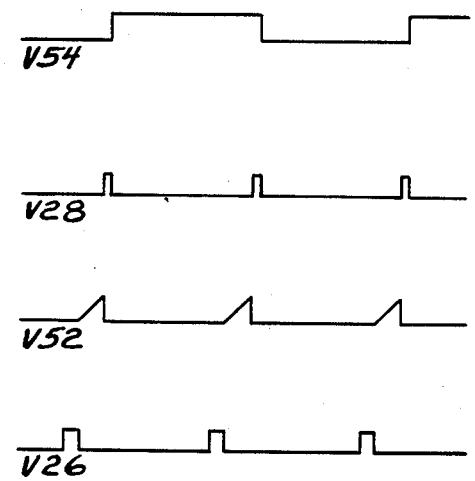
FIG. 3 is a set of waveforms occurring at various points in the circuit of FIG. 1.

The output of coarse delay adjust circuit 26 is a signal V26 (FIG. 3) which contains pulses generally at the frequency of $2f_H$, and these are applied to the input of the fine delay adjust circuit 28. Circuit 28 can adjust the phase of flyback pulse FB by fine adjusting the output of the coarse delay adjust circuit 26. However, circuit 28 has a limited range of about ±3 microseconds. Illustratively, this is done by charging a capacitor 52 starting at any one of the chosen edges of the $2f_H$ pulses from circuit 26. In this illustration the negative going edge of the V26 pulse has been chosen. The voltage waveform or the capacitor 52 is shown by waveform V52 (FIG. 3). The charging current to capacitor 52 is defined by the analog output of error amplifier 22. When capacitor 52 reaches a threshold, an output pulse is generated. This output pulse, occurring at the frequency of $2f_H$, as shown in waveform V28 (FIG. 3), is divided by two in a divider 54. The output of divider 54 is a waveform V54 (FIG. 3) which is a square wave at a frequency of $f_H$. These are applied to the pulse width modulator circuit 18 and, as modified thereby, to the horizontal system 20.

Figure 4B:
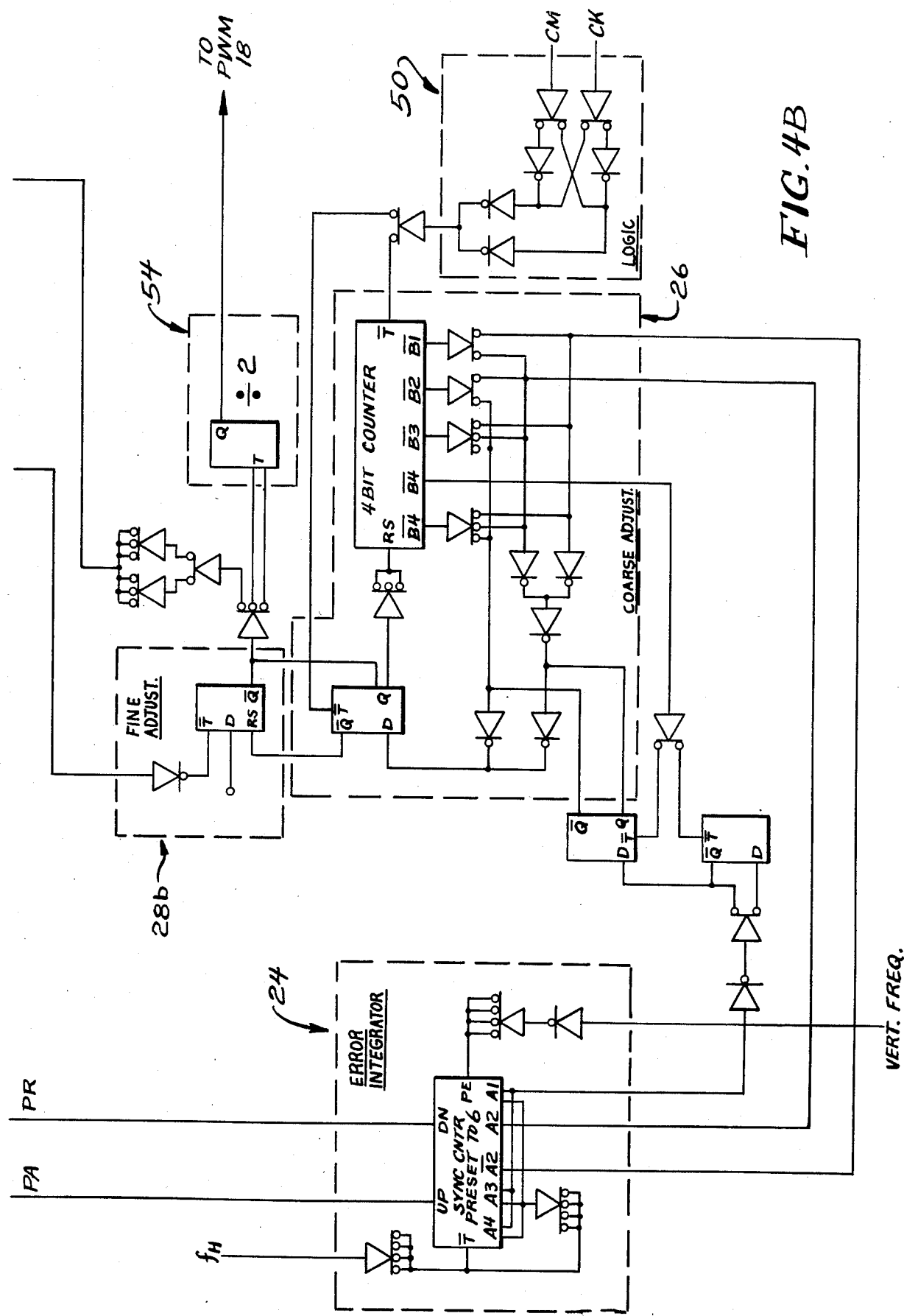

Although the circuits mentioned herein are ordinary building blocks used by television engineers ordinarily skilled in the art, further figures are provided in FIG. 4 in the interest of full and complete disclosure. These circuits will be readily comprehended by engineers skilled in the art and need no further explanation beyond that given above the operation of the combination of circuits. Thus, the remaining figures show, in I²L (integrated injection logic) format, the illustrative embodiments of phase detector 12, error amplifier 22, error integrator 24, coarse delay adjust circuit 26, and fine delay adjust circuit 28.

It will be appreciated that the delay time $t_d$ of the flyback pulse FB has both static and dynamic components. The static components are not uniform due to the tolerances in transistors, yokes, and other elements involved in the horizontal flyback system. However, once determined, these elements remain essentially static. On the other hand, dynamic components fluctuate continuously. By virtue of the illustrated embodiment of the present invention, the dynamic delay is compensated for by the fine delay adjust circuit 28, which is matched to these requirements. The coarse delay adjust circuit 26 is automatically ranged when the television receiver is turned on. Generally it should remain in one state, allowing the fine delay adjust circuit 28 to phase lock the flyback pulse. The coarse adjustment compensates for tolerances, as mentioned above, in various elements of the horizontal system 20. This eliminates the need for factory adjustment, thereby reducing the cost of the product.

While the present invention has been described in terms of an illustrative embodiment, the description and illustrations herein are not to be taken in a limitative sense but rather in a illustrative sense, and the scope of protection afforded to the present invention is intended to be defined by the appended claims. Those who are skilled in the art will appreciate that various modifications can be made to the illustrative embodiment herein, and it is intended that such modifications are within the scope of the present invention.

What is claimed as the invention is:

1. A circuit for phase locking the flyback pulse of a television horizontal system to a reference signal comprising:
   a detector coupled to determine phase differences between the flyback pulse and the reference signal and arranged to provide an error signal indicating said phase differences;
   a control circuit coupled to receive said error signal and including a first amplifier providing a first control signal which is analog, said control circuit also providing a second control signal;
   a first delay circuit coupled to respond to said first control signal;
   a second delay circua second control signal;
   a first delay circuit coupled to respond to said first control signal;
   a second delay circuit coupled to respond to said second control signal;
   said delay circuits being arranged to output a phase adjusted signal to said television horizontal system thereby to control the timing of the flyback pulse.

2. The circuit according to claim 1 wherein said first amplifier provides an output which is linear over a first range of input valves, said output constituting said first control signal.

3. The circuit according to claim 2 wherein said control circuit further comprises a second amplifier whose output is linear over a second range of input values wider than said first range, said second control signal being based upon the output of said second amplifier.

4. The circuit according to claim 2 wherein said control circuit is coupled to provide said second control signal and wherein said second control signal indicates when said error signal is outside a second range of input values.

5. The circuit according to claim 1 wherein said control circuit includes said first amplifier providing said first control signal according to a first function of said error signal, said control circuit further comprising a second amplifier providing said second control signal according to a second function of said error signal.

6. The circuit according to claim 1 wherein said first amplifier comprises:
   a first differential amplifier coupled to receive said error signal, said first differential amplifier being arranged to provide said first control signal, said first control signal varying in accordance with a first function with respect to said error signal, said function being linear over a first range of input values; and
   wherein said control circuit further comprises a second differential amplifier coupled to receive said error signal and to provide an output signal varying according to a second function with respect to said error signal and being linear over a second range of input values, said second range being wider than said first range, said second control signal being derived from said output signal of said second differential amplifier and indicating when said input is outside said second range.

7. The circuit according to claim 1 wherein said second delay circuit includes an adjustable divider circuit.

8. The circuit according to claim 1 wherein said first delay circuit is coupled to receive output signals from said second delay circuit at a phase determined by said second delay circuit, said second delay circuit being coupled to receive at an input signals related to the horizontal frequency.

9. A method for automatically phase locking the flyback pulse of a television horizontal system to a reference pulse comprising the steps of:
   detecting a phase difference between the flyback pulse and the reference pulse and providing an error signal indicative of said phase difference;
   providing a first control signal which is linear over a first range of input values, based on said error signal and providing a second control signal which is linear over a second range of input values wider than said first range;
   making coarse adjustments to the phase of said flyback pulse based on said second control signal to reduce said phase difference when said flyback pulse deviates from the phase of said reference pulse by more than a predetermined value; and
   making fine adjustments in the phase of said flyback pulse based on said first control signal to further reduce said phase difference.

10. The circuit according to claim 9 wherein said step of providing the first and the second control signals includes providing said first control signal according to a linear function when said error signal is within said first range of input values and wherein said second control signals indicates when said error signal is outside said second range of input values.

11. The method of claim 10 wherein said first control signal is developed according to said linear function of said error signal and said second control signal is provided according to a second function of said error signal.

12. The method according to claim 9 wherein said step of providing coarse adjustments includes selecting a divisor and dividing high frequency signals with said divisor.

13. A circuit for phase locking the flyback pulse of a television horizontal system to a reference signal comprising:
   a detector coupled to determine phase differences between the flyback pulse and the reference signal, and arranged to provide an error signal indicating said phase differences;
   a control circuit coupled to receive said error signal and to provide first and second control signals;
   a first delay circuit coupled to respond to said first control signal;
   a second delay circuit coupled to respond to said second control signal, said first delay circuit being coupled to receive signals from said second delay circuit at a phase determined by said second delay circuit, said first delay circuit being arranged to output a phase adjusted signal to the horizontal system thereby to control the timing of the flyback pulse.

14. The circuit according to claim 13 wherein said control circuit includes a first amplifier providing said first control signal and wherein said first control signal is analog.

15. The circuit according to claim 14 wherein said control circuit includes said first amplifier and a second amplifier, said first and second amplifiers each having outputs which are linear over respective first and second ranges of input values, said range over which said second amplifier is linear being wider than said range in which said first amplifier is linear.

16. The circuit according to claim 15 wherein said control circuit provides said second control signal which indicates when said error signal is outside said second range of input values.

17. The circuit according to claim 13 wherein said control circuit comprises:

a first differential amplifier coupled to receive said error signal, said first differential amplifier being arranged to provide said first control signal, said first control signal varying in accordance with a first function with respect to said error signal, said function being linear over a first range of values of said error signal; and a second differential amplifier coupled to receive said error signal and to provide an output varying according to a second function with respect to said error signal and being linear over a second range of values of said error signal, said second range being wider than said first range, said second control signal being derived from the output of said second differential amplifier and indicating when said output is outside its linear range.

* * * * *